US012674571B1

(12) United States Patent
Kang

(10) Patent No.: US 12,674,571 B1
(45) Date of Patent: Jul. 7, 2026

(54) SOLAR CELL STREET LIGHTS WITH COOLING FUNCTION

(71) Applicant: TOP SYSTEM CO., LTD., Gyeonggi-do (KR)

(72) Inventor: Taewook Kang, Gyeonggi-do (KR)

(73) Assignee: TOP SYSTEM CO., LTD., Gyeonggi-do (KR)

(*) Notice: Subject to any disclaimer, the term of this patent is extended or adjusted under 35 U.S.C. 154(b) by 0 days.

(21) Appl. No.: 19/277,641

(22) Filed: Jul. 23, 2025

(51) Int. Cl.
*F21S 8/08* (2006.01)
*F21S 9/03* (2006.01)
*F21V 21/116* (2006.01)
*F21V 29/60* (2015.01)
*F21Y 115/10* (2016.01)

(52) U.S. Cl.
CPC .............. *F21V 29/60* (2015.01); *F21S 8/088* (2013.01); *F21S 9/037* (2013.01); *F21V 21/116* (2013.01); *F21Y 2115/10* (2016.08)

(58) Field of Classification Search
CPC .... F21S 8/08; F21S 8/085; F21S 8/086; F21S 8/088; F21S 6/00; F21S 6/005; F21S 9/00; F21S 9/02; F21S 9/03; F21S 9/032; F21S 9/035; F21S 9/037
See application file for complete search history.

(56) References Cited

U.S. PATENT DOCUMENTS

2008/0285265 A1* 11/2008 Boissevain ............. F21V 29/74 362/218
2014/0104859 A1* 4/2014 Araman .................. F21V 29/77 362/373
2024/0113651 A1* 4/2024 Jacques ................... H10F 19/80
2025/0224086 A1* 7/2025 Pahlevaninezhad ......................... F21V 23/0464

FOREIGN PATENT DOCUMENTS

| | | | | |
|---|---|---|---|---|
| KR | 1020070097004 | | 10/2007 | |
| KR | 20180106078 A | * | 10/2018 | F21S 8/085 |
| KR | 1020200124809 | | 11/2020 | |
| KR | 1020220005863 | | 1/2022 | |
| KR | 20220164885 A | * | 12/2022 | F21V 29/503 |

OTHER PUBLICATIONS

English Translation of KR-20220164885, 2018 (Year: 2018).*

* cited by examiner

*Primary Examiner* — Thien M Le
*Assistant Examiner* — April A Taylor
(74) *Attorney, Agent, or Firm* — IPLA P.A.

(57) ABSTRACT

A solar cell street lights with a cooling device for streetlight head portion, includes: a vertical pillar fixed to a ground; a hollow mounting rod obliquely connected upward from one side of an upper end portion of the vertical pillar; a lower housing; a mounting hole for mounting a LED module formed on the other side and one end connected to the mounting rod to be communicated with the second hollow portion; and an upper housing mounted on an upper surface portion of the lower housing to form an internal space (A) together with the lower housing and having one end connected to the mounting rod (to be communicated with the second hollow portion, an air outlet for discharging air introduced through the air inlet, and a mounting plate, on which the solar panel is mounted and fixed, formed on an outer surface thereof.

13 Claims, 22 Drawing Sheets

SOLAR CELL STREET LIGHTS WITH COOLING FUNCTION

BACKGROUND

The present invention relates to a solar cell streetlight having a cooling function, and more particularly, to a solar cell streetlight having a cooling function, which is a system that prevents a decrease in power generation of a solar panel due to high temperature of direct sunlight, a decrease in battery performance due to high heat, and a shortened lifespan of LEDs by improving the airflow using the wind path of natural wind, i.e., air pressure difference, thereby cooling solar panels, LED modules, and batteries.

In addition, the present invention relates to a solar cell street light with colling function that uses wind power as an auxiliary source to insulate a battery in the winter and minimize overcooling, thereby preventing a decrease in the power generation output of the battery, increasing battery efficiency and enabling auxiliary charging of the battery.

Additionally, the present invention relates to a solar cell street light with colling function that prevents contamination of solar panels by birds and allows foreign substances such as sand and fine dust to be smoothly removed through natural ventilation.

In general, street lights have the problem of high power consumption because they use light bulbs, which are power-consuming light sources. Currently, there is a trend toward applying LEDs, which consume less power, have high luminous efficiency, and can be used semi-permanently, to streetlights.

However, since these LEDs cannot meet the high brightness required for street lights with just one LED, several to several dozen LEDs are connected to each other to form a module to achieve high brightness, and these modules are connected in series or parallel to form a single lamp to meet the high brightness required for lighting such as street lights.

In this way, when LED lighting consisting of modules composed of multiple LEDs is turned on for a long period of time, heat generation is accelerated because they are placed inside a housing, and LEDs with low heat resistance may have their efficiency reduced by the heat and the lighting may break down. Therefore, the lighting using the LEDs should have a cooling structure to dissipate the heat of the LEDs and prevent breakdown due to overheating.

In addition, the generation efficiency of the solar panel decreases due to high temperatures caused by direct sunlight, and when the street lights operate using a battery, prolonged use can lead to battery overheating, resulting in reduced power efficiency.

To overcome these problems, Korean Patent Publication No. 2007-0097004 (Cooling device for lighting with built-in power light-emitting diode) provides a streetlight that uses a power LED chip, which is a high-brightness LED, and discloses a method of forced cooling using cooling water to cool the heat generated from the power LED chip. However, this also has the inconvenience of having to operate a separate cooling device because it adopts a forced cooling method, and its structure is also complex, so it has the disadvantage of requiring enormous costs for installation and manufacturing.

Moreover, Koran Patent Registration No. 10-2260208 discloses a technology for performing cooling and cleaning operations on solar panels using rainwater. However, it requires a configuration for circulating rainwater and does not address the cooling structure of batteries and LEDs.

Korean Patent Publication No. 10-2022-0005863 (Solar power street lights with built-in battery) allows heat dissipation via an aluminum street lights body, and cooling by air through the space between the body and the blocking plate attached to the upper surface thereof, while blocking direct sunlight to prevent high-temperature heat generation damage. However, since the body is made of high thermal conductivity aluminum, it lacks economic efficiency. Additionally, during winter, overcooling can reduce battery performance.

SUMMARY OF THE INVENTION

The present disclosure has been made in an effort to solve the problems described above, and an objective of the present disclosure is to provide a solar cell street lights with a cooling function that prevents errors in the electric circuit of the PCB due to high temperature by sequentially cooling the PCB, solar panel, LED module, and battery and by securing a natural wind path, and prevents a decrease in the power generation of the solar panel due to the high temperature of direct sunlight, a decrease in battery performance due to high temperature, and a shortening of the lifespan of the LED.

In addition, another object of the present invention is to provide a solar cell street lights with a cooling function that enables a system for cooling overheated components (battery, LED, PCB, solar cell) to operate without power and enables the battery to heat up to a normal temperature range when it is overcooled.

According to an aspect of the invention to achieve the object described above, there is provided a solar cell street lights with a cooling device for streetlight head portion, where a battery and an LED module are accommodated together and a solar panel is mounted, including: a vertical pillar fixed to a ground at a lower end thereof and having a first hollow portion formed along its body and an air inlet, through which an external air is introduced, communicated with the first hollow portion; a hollow mounting rod obliquely connected upward from one side of an upper end portion of the vertical pillar and having a second hollow portion communicated with the first hollow portion and formed along its body; a lower housing having a receiving portion for receiving a battery formed on one side thereof; a mounting hole for mounting a LED module formed on the other side; and one end connected to the mounting rod to be communicated with the second hollow portion; and an upper housing mounted on an upper surface portion of the lower housing to form an internal space together with the lower housing and having one end connected to the mounting rod to be communicated with the second hollow portion, an air outlet for discharging air introduced through the air inlet, and a mounting plate, on which the solar panel is mounted and fixed, formed on an outer surface thereof; wherein the air introduced through the air inlet passes through the vertical pillar, the mounting rod, and the receiving portion, and is discharged through the air outlet.

In addition, the receiving portion includes an opening for insertion and removal of the battery formed at a lower portion thereof; a side wall formed around a lateral circumference thereof; a plurality of seating ribs formed on a floor surface thereof where the battery is placed; a through-hole communicating with the internal space formed between the seating ribs; and a cover for opening and closing the opening, so that it allows a heat released from the battery to be discharged through the through holes and the air introduced from the mounting rod to flow near the through-hole, thereby carrying the battery's heat with the air and eventually being discharged through the air outlet.

In addition, an air guide is detachably coupled to a floor surface of the receiving portion, so as to guide the air, which is introduced from the mounting rod toward the air outlet and the air guide includes a top plate facing the floor surface of the receiving portion, a pair of side plates formed to face each other at edges of the top plate, an air channel formed between the pair of side plates, a plurality of air pipes arranged across the air channel and coupled at both ends to the side plates and through which the air introduced from the mounting rod passes, and an arc-shaped guide plate extending from the side plates to guide the air, that has passed through the air pipes, toward the outlet.

In addition, among the multiple air pipes, at least one air pipe is disposed to pass through the arc-shaped guide plate and extends over the upper side of the LED module.

In addition, an air guiding groove connected to the air outlet is formed on an outer surface of the upper housing.

In addition, air inlets/outlets are formed on both opposing side surface portion of the lower housing and are communicated with the air channel of the air guide.

In addition, an auxiliary mounting rod is connected obliquely downward from the other side of the upper end portion of the vertical pillar and has a third hollow portion formed in communication with the first hollow portion and the second hollow portion; a pair of support brackets are coupled to the mounting rod and the auxiliary mounting rod; and a panel support frame for supporting another solar panel is fixed to the support brackets.

In addition, a spacing space is formed between the panel support frame and the solar panel.

In addition, the vertical pillar is equipped with a blocking member that blocks both side portions and the upper portion of the air inlet; a bottom member that blocks a lower portion of the air inlet and has multiple through-holes formed therein; and a plug member that opens and closes each of the through-holes.

In addition, the solar cell street lights further includes a fan member that rotates by natural wind is rotatably mounted on the upper end portion of the vertical pillar; a generator that generates electricity by the rotation of the fan member; a protective member that surrounds the battery and has a heating wire that receives electric energy from the generator and generates heat; a sensor member that senses the heating temperature of the battery; and a switch that selectively supplies electric energy generated from the generator to the battery or the heating wire according to the sensing temperature of the sensor member.

In addition, the solar cell street lights further includes an alarm member for generating an alarm sound, high frequency or low frequency formed on the upper housing, when a bird approaches the upper housing, thereby preventing the approach of birds and preventing contamination of the solar panel by excrement.

In addition, the solar cell street lights further includes a hollow air conduit placed in parallel to the vertical pillar, allowing the external air to be drawn in from below; and a nozzle connected to the upper end portion of the air conduit, which blows the external air from the bottom of the air conduit toward the solar panel.

In addition, the solar cell street lights further includes a heat sink that is coupled to the air pipe and dissipates the heat generated from the LED module.

In addition, at least one air passage pipe penetrating the receiving portion is arranged in the receiving portion so as to dissipate heat from a circuit board received in the receiving portion.

BRIEF DESCRIPTION OF THE DRAWINGS

The above and other objects, features and advantages of the present invention will be more apparent from the following detailed description taken in conconfluence with the accompanying drawings, in which.

REFERENCE SIGNS LIST

Figure 1:
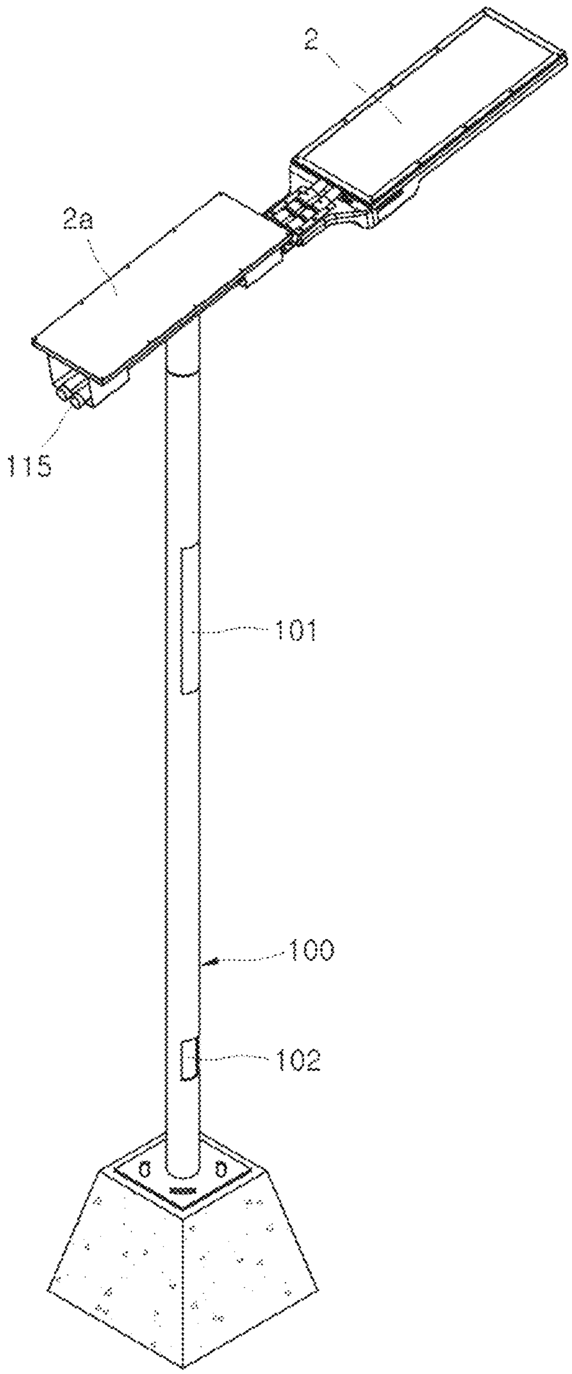
FIG. 1 is a perspective view showing a streetlight according to an embodiment of the present invention.

1: Battery
2, 2*a*: Mounting Plate
3: Through-Hole
100: Vertical pillar
101: First hollow portion
102: Air inlet
110: Mounting rod

112: Second hollow portion
115: Auxiliary mounting rod
117: Panel support frame
120: Lower housing
121: Receiving portion
125: Air inlet/outlet
130: Upper housing
131: Air outlet
132: Air guiding groove
140: Air guide

DETAILED DESCRIPTION OF THE PREFERRED EMBODIMENT

The streetlight of the present invention is configured to use a natural airflow path to cool a solar panel, a LED module, and a battery, thereby preventing reduced power output from the solar panel due to heat, battery degradation, and shortening of the LED's lifespan caused by high temperatures.

Figure 6:
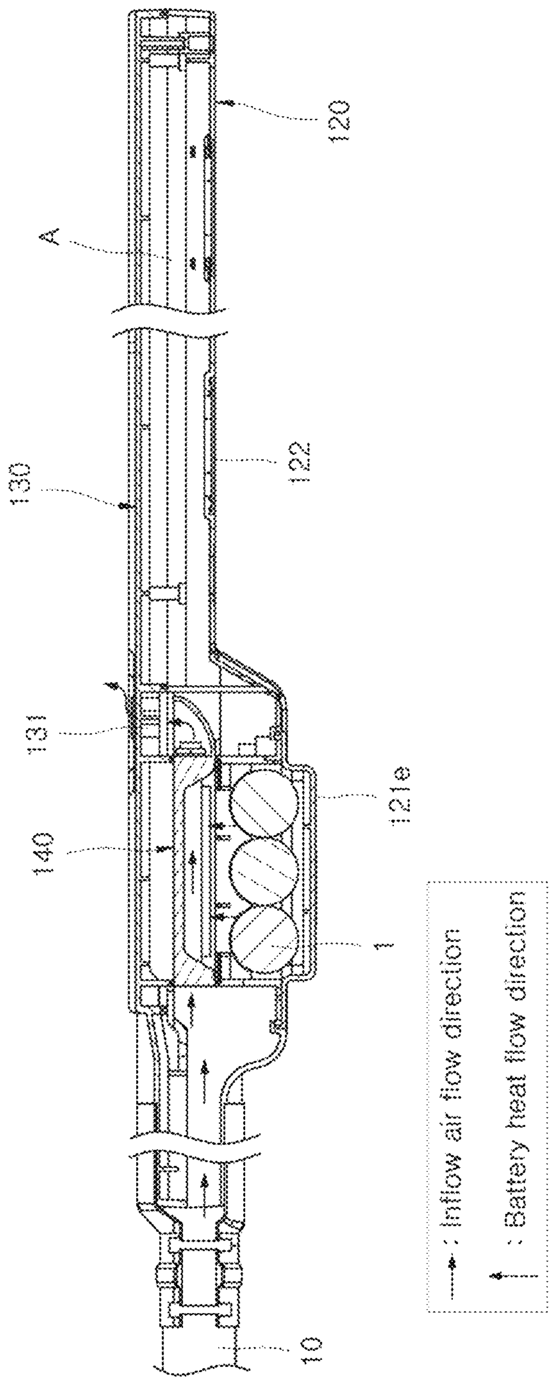
FIG. 6 is a cross-sectional view of a streetlight head portion according to an embodiment of the present invention.
Figure 7:
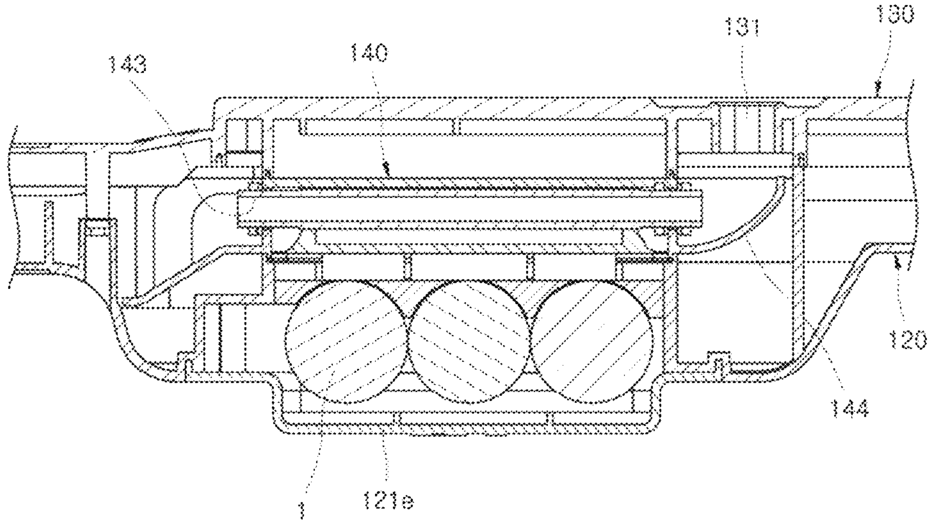
FIG. 7 is an enlarged view of a battery receiving portion shown in FIG. 6.

Referring to FIG. 1 and FIG. 6, the streetlight head portion applied in the embodiment of the present invention has a structure in which the battery (1) and LED module are housed together, and a solar panel (not shown) is mounted and coupled to the mounting plate (2).

Referring to FIG. 1 and FIG. 6, the cooling unit of the streetlight head portion according to the embodiment of the present invention comprises a vertical pillar (100), a mounting rod (110), a lower housing (120), and an upper housing (130).

Figure 2:
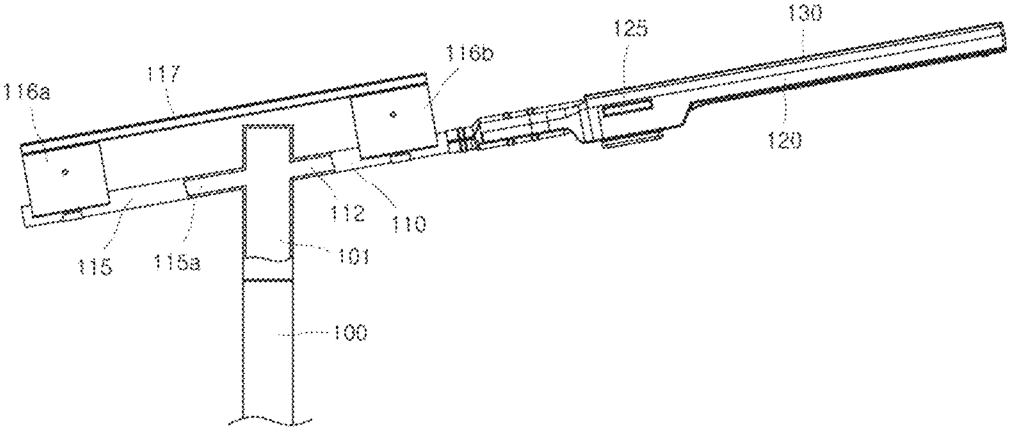
FIG. 2 is a side view of a streetlight head portion shown in FIG. 1.

Referring to FIG. 1 and FIG. 2, the vertical pillar (100) is fixed to a ground at a lower end thereof and has a first hollow portion (101) formed along its body and an air inlet (102), through which an external air is introduced, communicated with the first hollow portion (101);

The hollow mounting rod (110) is obliquely connected upward from one side of an upper end portion of the vertical pillar (100) and has a second hollow portion (112) communicated with the first hollow portion (101) and formed along its body;

Reference numeral 115 indicates an auxiliary mounting rod, which is connected obliquely downward from the other side of the upper end portion of the vertical pillar (100) and has a third hollow portion (115*a*) formed in communication with the first hollow portion (101) and the second hollow portion (112).

Figure 14A:
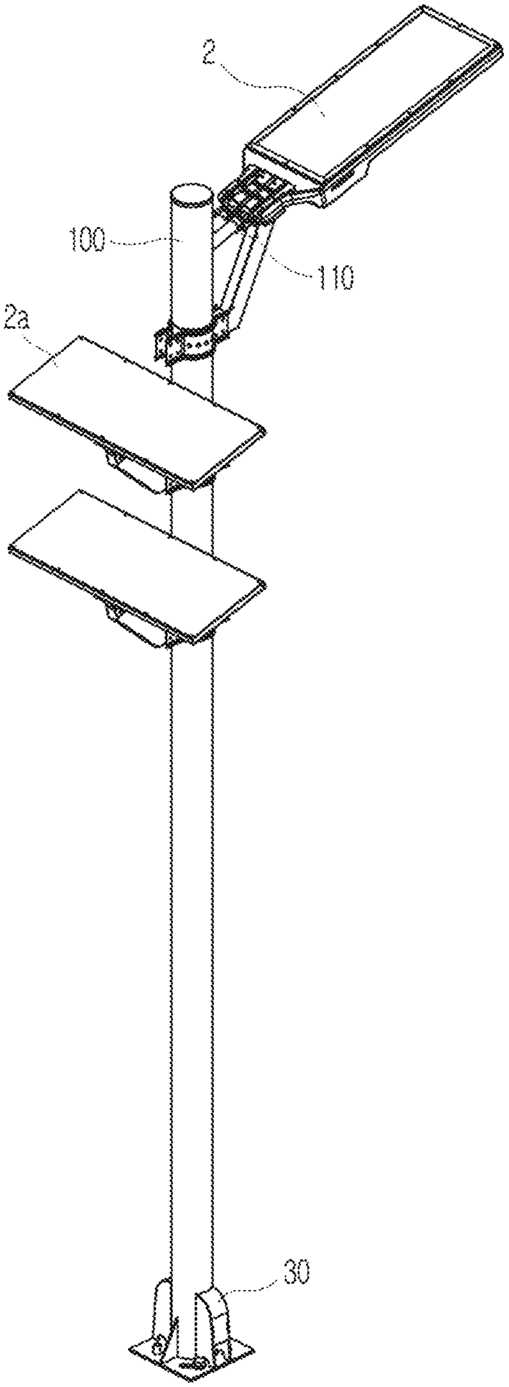
FIG. 14A is a perspective view showing another embodiment of the present invention.
Figure 18:
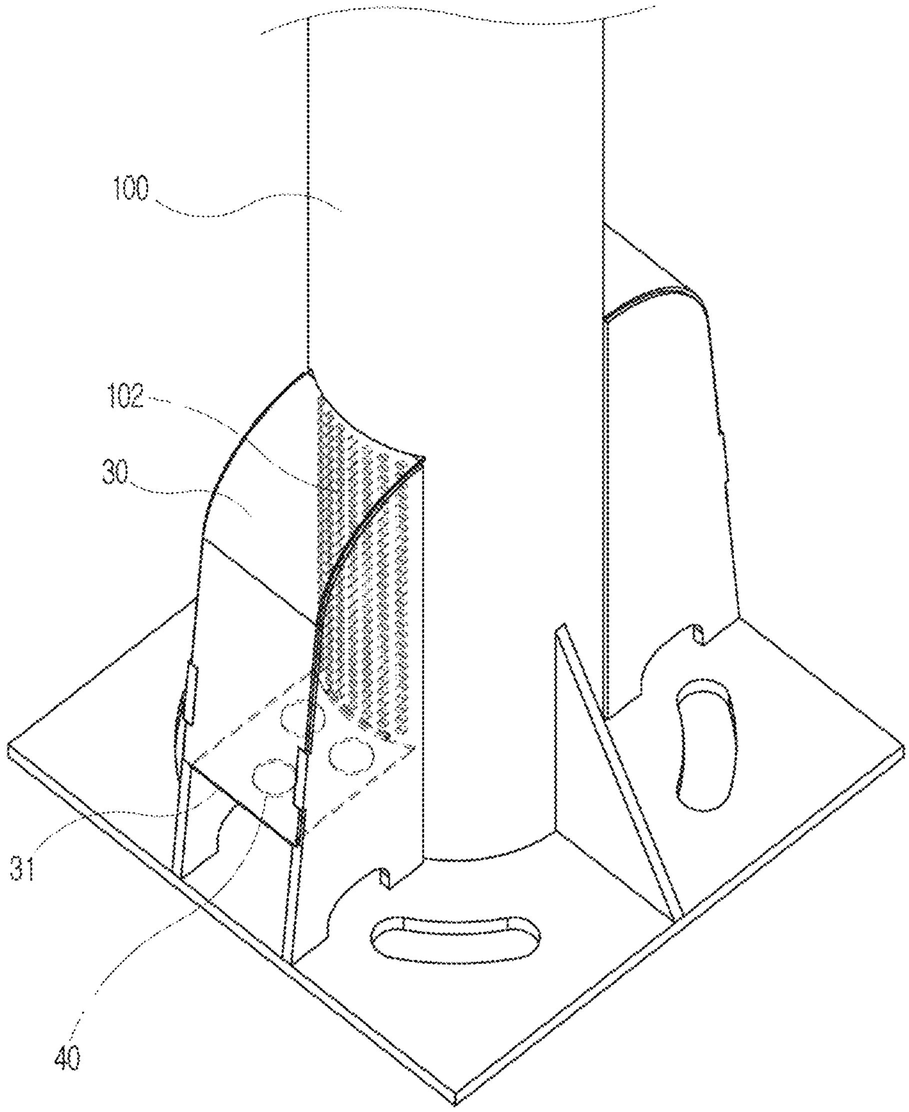
FIG. 18 is a perspective view showing another example of the present invention of a lower portion of a vertical pillar.

Meanwhile, referring to FIG. 14A and FIG. 18, the lower end portion of the vertical pillar (100) is equipped with a blocking member (30) that blocks both side portions and the upper portion of the air inlet (102); a bottom member (31) that blocks the lower portion of the air inlet (102) and has multiple through-holes formed therein; and a plug member (40) that opens and closes each of the through-holes.

By opening and closing the plug member (40), the amount of air entering through the air inlet (102) can be controlled, allowing for adjustment of the cooling level of the streetlight head portion during winter or summer seasons. Additionally, the blocking member (30) and the bottom member (31) prevent the external material from entering the air inlet (102) from the outside and causing contamination thereof.

The auxiliary mounting rod (115) will be described later.

Referring to FIG. 5, FIG. 6, FIG. 9, and FIG. 10, the lower housing (120) includes a receiving portion (121) for receiving a battery (1) formed on one side thereof; a mounting hole (122) for mounting a LED module formed on the other side; and one end connected to the mounting rod (110) to be communicated with the second hollow portion (112).

Figure 3:
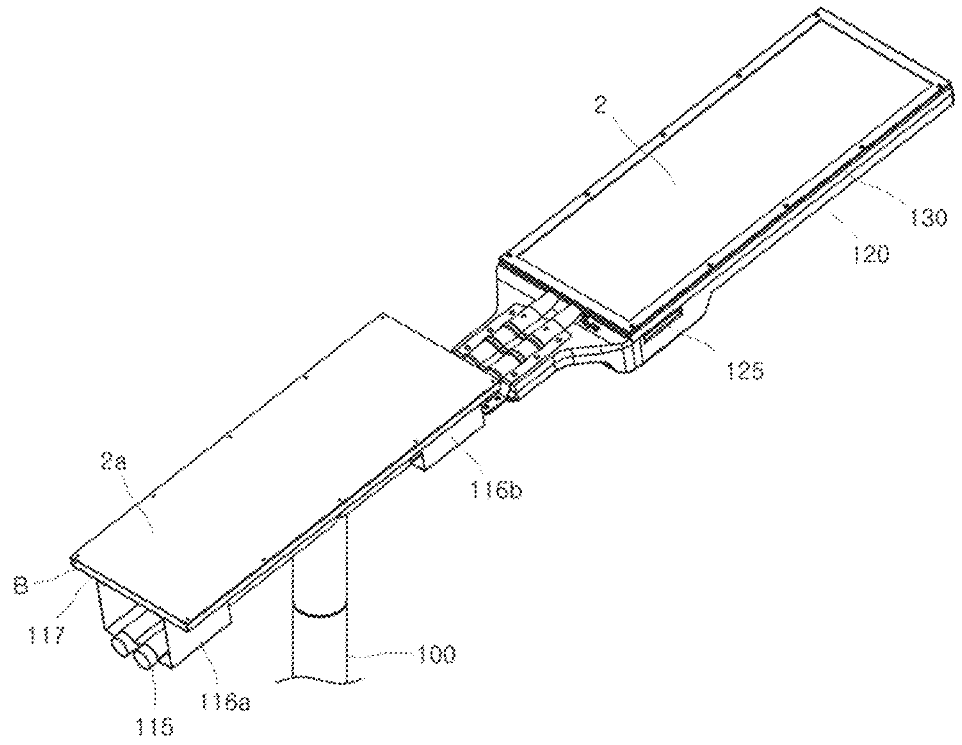
FIG. 3 is an enlarged view of a streetlight head portion shown in FIG. 1.
Figure 4:
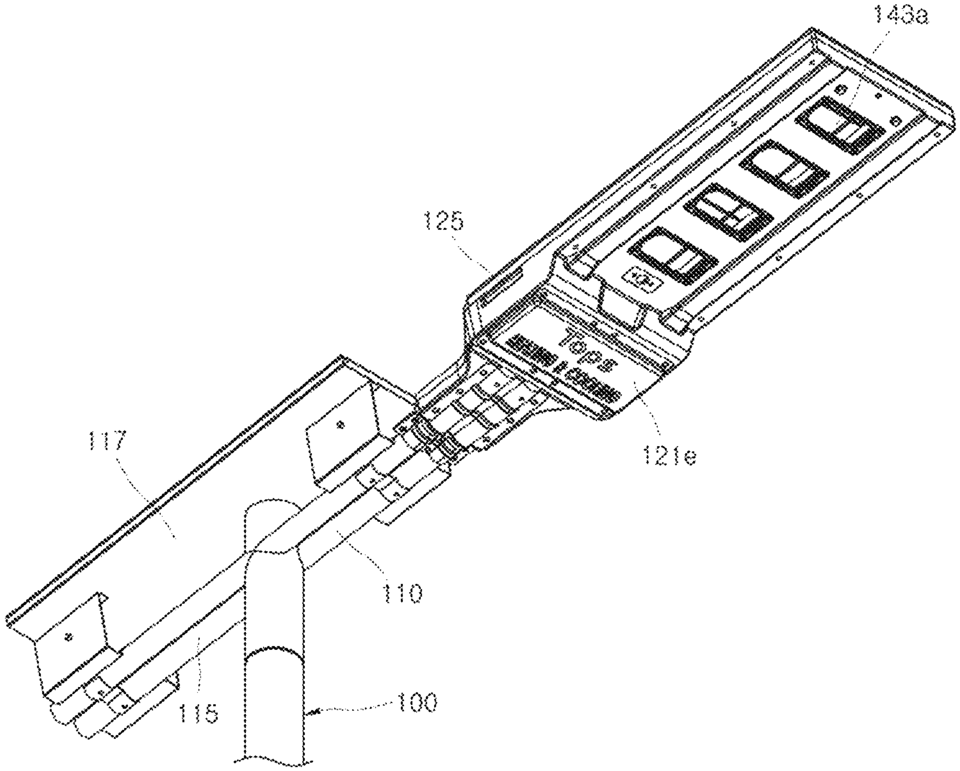
FIG. 4 is a bottom perspective view of a streetlight head portion shown in FIG. 1.
Figure 5:
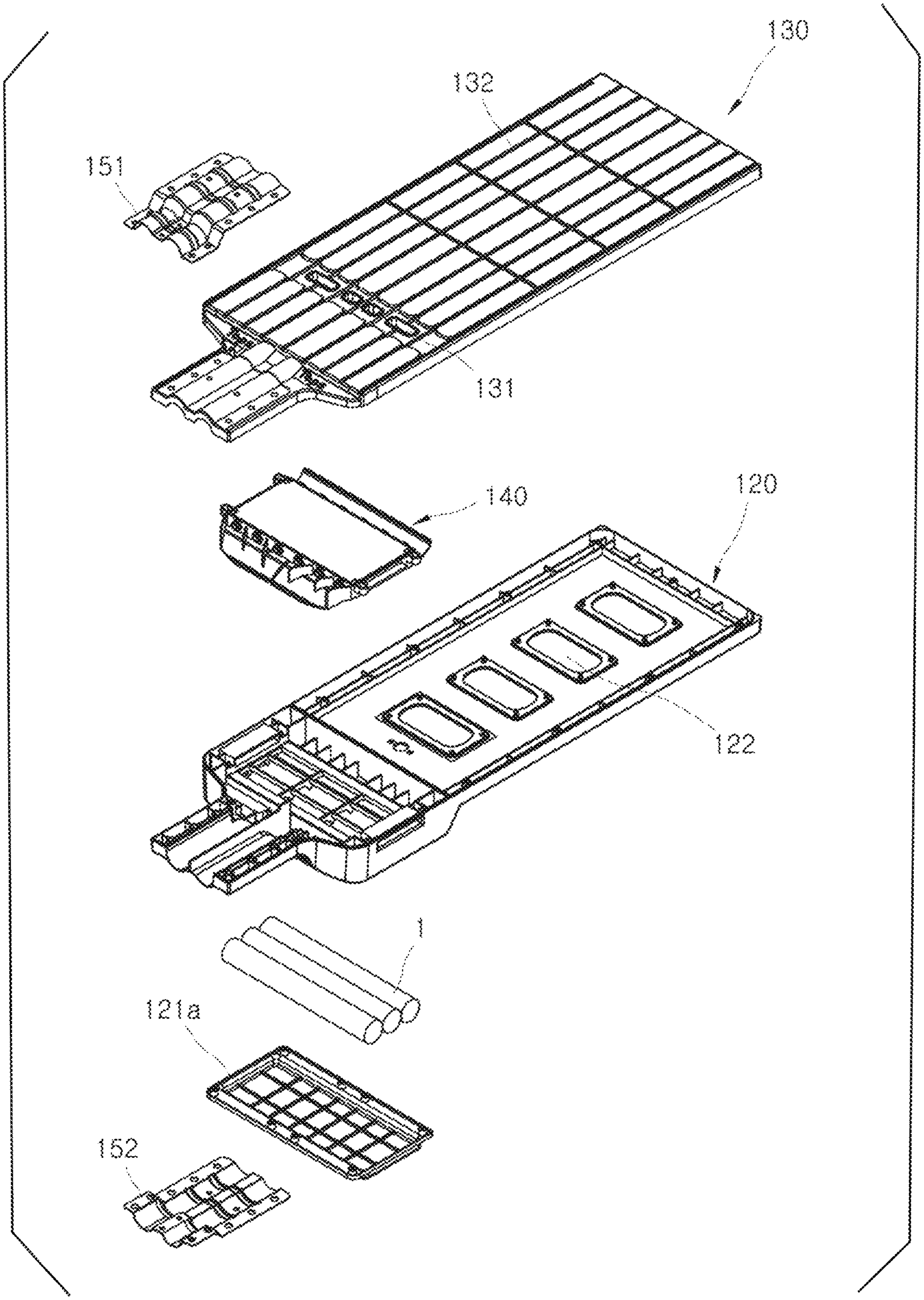
FIG. 5 is an exploded perspective view of a streetlight head portion according to an embodiment of the present invention.

Referring to FIG. 3, FIG. 5, and FIG. 6, the upper housing (130) is mounted on an upper surface portion of the lower housing (120) to form an internal space (A) together with the lower housing (120) and has one end connected to the mounting rod (110) to be communicated with the second hollow portion (112), an air outlet (131) for discharging air introduced through the air inlet (102), and a mounting plate (2), on which the solar panel is mounted and fixed, formed on an outer surface thereof;

In the head portion cooling device with the above configuration, referring to FIG. 2, the air introduced through the upper portion of the vertical pillar (100), the air inlet (102) of the vertical pillar (100), and the third hollow portion (115*a*) of the auxiliary mounting rod (115) is discharged through the air outlet (131) via the vertical pillar (100), the mounting rod (110), and the receiving portion (121), so that the overheated battery (1) and LED module can be air-cooled.

Figure 10:
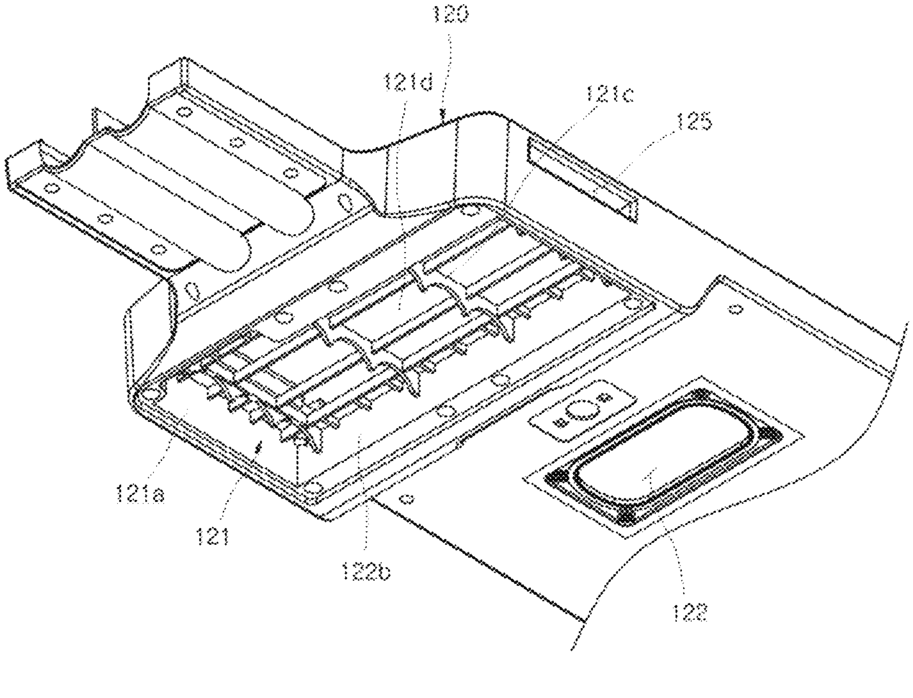
FIG. 10 is a perspective view of a battery receiving portion according to an embodiment of the present invention.
Figure 11:
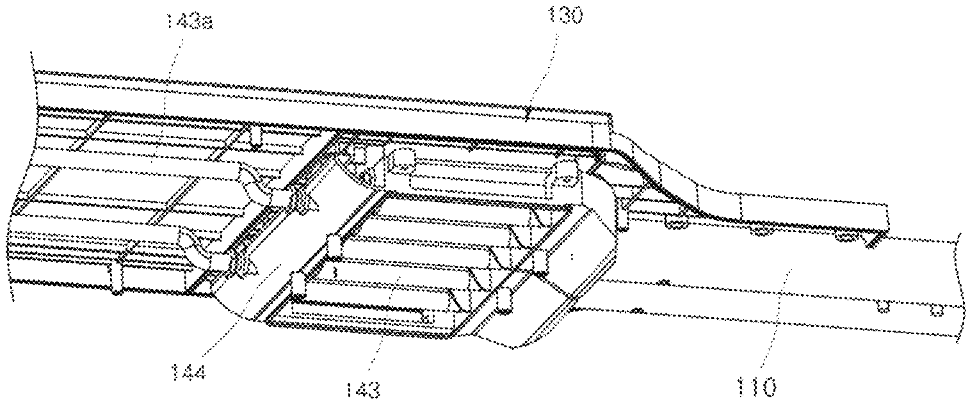
FIG. 11 is a perspective view showing an air guide and an upper housing according to an embodiment of the present invention.
Figure 12:
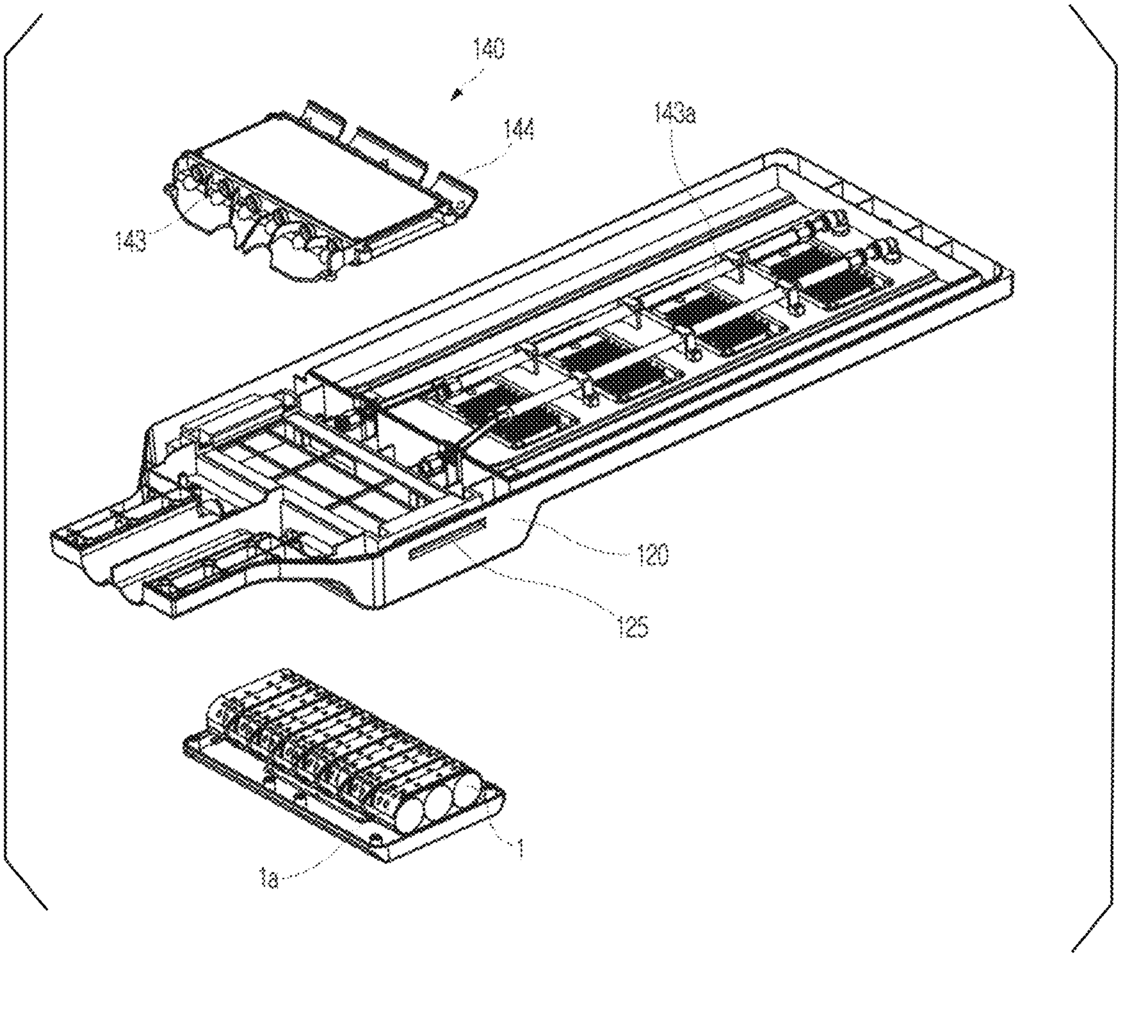
FIG. 12 is a perspective view showing another example of the present invention in which a protective member is provided on a battery.
Figure 13:
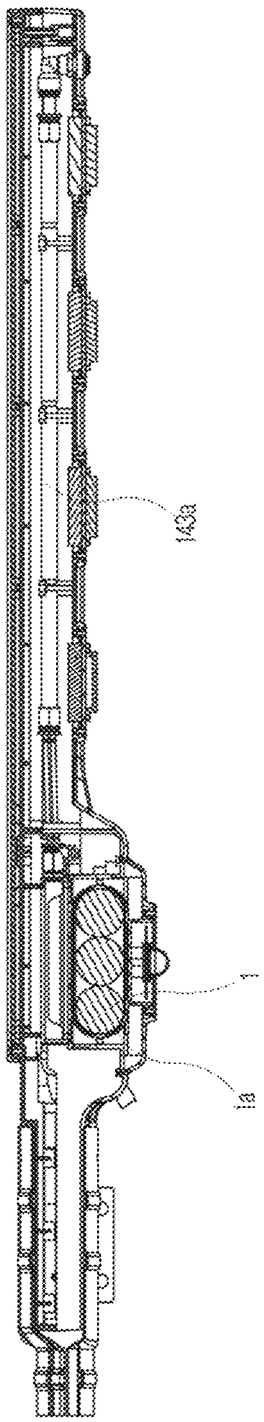
FIG. 13 is an assembled cross-sectional view of FIG. 12.

Referring to FIG. 6 and FIG. 10, the receiving portion (121) in which the battery (1) is received includes an opening (121*a*) for insertion and removal of the battery (1) formed at a lower portion thereof, a side wall (121*b*) formed around a lateral circumference thereof, a plurality of seating ribs (121*c*) formed on a floor surface thereof where the battery (1) is placed, and a through-hole (121*d*) communicating with the internal space (A) formed between the seating ribs (121*c*). The opening (121*a*) is openable and closable by a cover (121*e*).

The structure of the receiving portion (121) allows the heat released from the battery (1) to be discharged through the through holes (121*d*) and the air introduced from the mounting rod (110) to flow near the through-hole (121*d*), thereby carrying the battery's heat with the air and eventually being discharged through the air outlet (131).

Referring to FIG. 6 to FIG. 9 and FIG. 12, an air guide (140) is detachably coupled to the bottom surface of the receiving portion (121), so as to guide the air, which is introduced from the mounting rod (110) toward the air outlet (131).

The air guide (140) includes a top plate (141) facing the floor surface of the receiving portion (120), a pair of side plates (142) formed to face each other at edges of the top plate (141), an air channel (145) formed between the pair of side plates (142), a plurality of air pipes (143) arranged across the air channel (145) and coupled at both ends to the side plates (142) and through which the air introduced from the mounting rod (110) passes, and an arc-shaped guide plate (144) extending from the side plates (142) to guide the air, that has passed through the air pipes (143), toward the outlet (131).

The air guide (140) configured as described above guides external air introduced through the mounting rod (110) toward the arc-shaped guide plate (144) via a plurality of air pipes (143), so that the air is discharged to the outside through the outlet (131) of the upper housing (130) and the air discharged through the air outlet (131) cools the solar panel.

Meanwhile, referring to FIG. 6 to FIG. 10, air inlets/outlets (125) that pass through both left and right sides are formed on side portions of the lower housing (120). The air inlets/outlets (125) are in communication with the air channel (145) of the air guide (140).

The external air entering through one air inlet/outlet (125) flows around the air pipe (140) and exits through the opposite air inlet/outlet (125) and the excess heat from the battery (1) is discharged to the outside through the through-holes (121*d*) of the receiving portion (121) and then through the air inlets/outlets (125).

Figure 8:
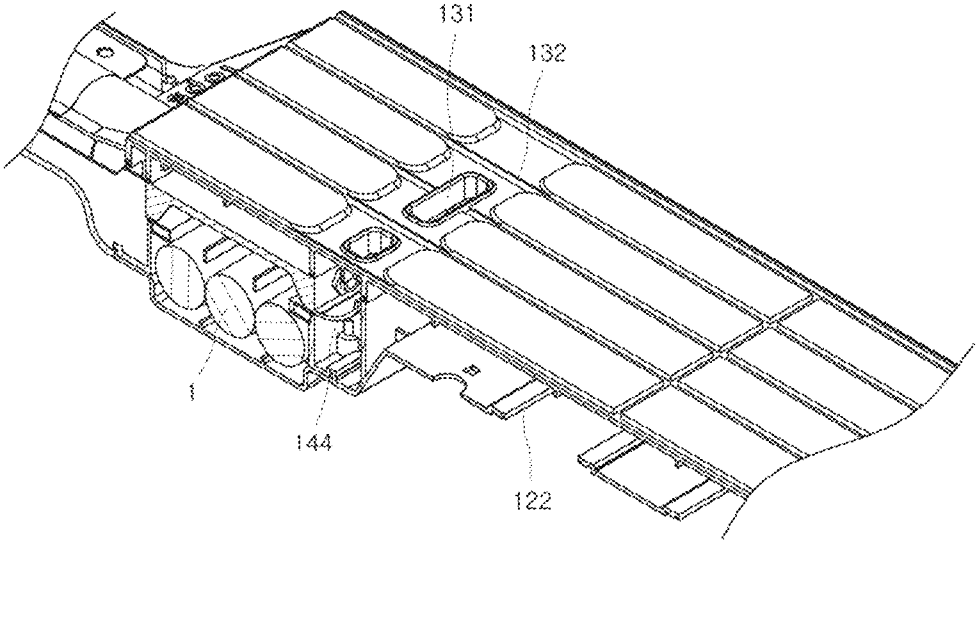
FIG. 8 is a partial cross-sectional perspective view of a streetlight head portion according to an embodiment of the present invention.
Figure 9:
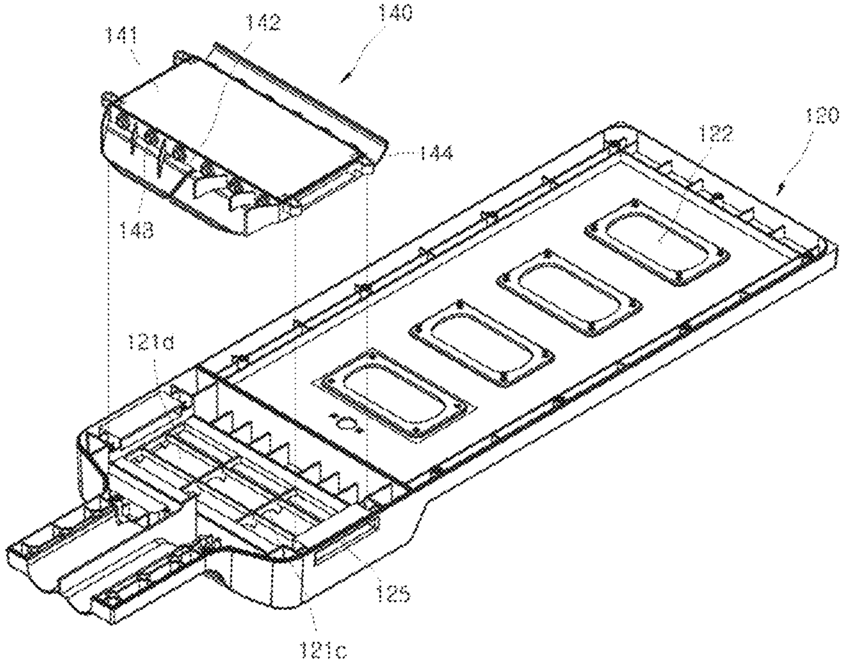
FIG. 9 is a perspective view showing an air guide and a lower housing according to an embodiment of the present invention.

Referring to FIG. 1, FIG. 5, and FIG. 8, a mounting plate (2) is provided on the upper surface of the upper housing (130) to which the solar panel (not shown) is fixed, and an air guiding groove (132) connected to the air outlet (131) is formed thereon. Accordingly, the air discharged through the air outlet (131) is guided along the air guiding groove (132) to cool the solar panel.

Referring to FIG. 4 and FIG. 11 to FIG. 13, among the multiple air pipes (143), at least one air pipe (143*a*) is disposed to pass through the arc-shaped guide plate (144) and extends over the upper side of the LED module, thereby cooling the heat generated from the LED module.

Referring to FIG. 1 to FIG. 4, the auxiliary mounting rod (115) is connected obliquely downward from the other side of the upper end portion of the vertical pillar (100) and has a third hollow portion (115*a*) formed in communication with the first hollow portion (101) and the second hollow portion (112). Both the main mounting rod (110) and the auxiliary mounting rod (115) are coupled to a pair of support brackets (116*a* and 116*b*).

The support brackets (116*a* and 116*b*) are fixed with a panel support frame (117) that supports an auxiliary mounting plate (2*a*). A spacing space (B) is formed between the panel support frame (117) and the auxiliary mounting plate (2*a*), allowing external air to flow through.

An additional solar panel is mounted and fixed to the auxiliary mounting plate (2*a*).

This configuration increases power generation by incorporating another solar panel. Furthermore, by placing the solar panels on both sides of the vertical pillar (100) it ensures that the street light can be stably erected.

Particularly, the external air flows not only through the air inlet (102) of the vertical pillar (100) but also through the third hollow portion (115*a*) of the auxiliary mounting rod (115), allowing a large volume of air to enter the internal spaces (A) of the upper and lower housings (130 and 120), thereby improving the cooling efficiency for the battery (1), the LED module, and the solar panel (2).

Figure 14B:
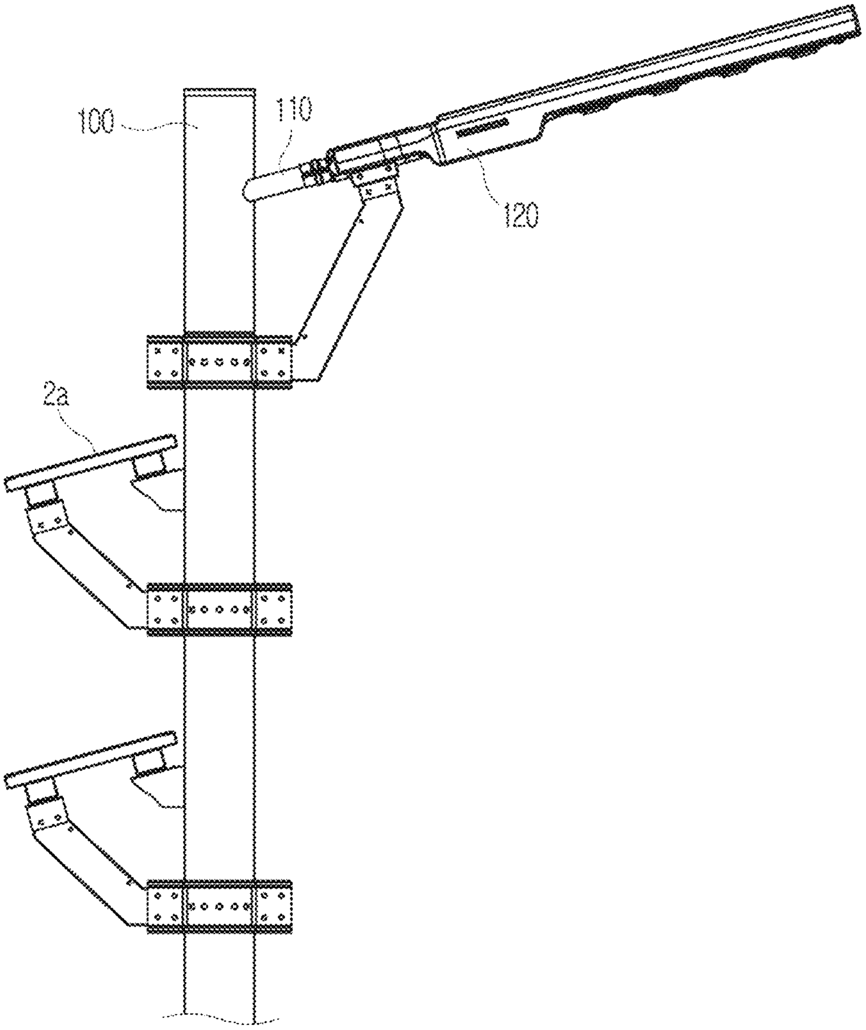
FIG. 14B is a side view of a main portion of FIG. 14A.

Referring to FIGS. 14A and 14B, in another example of the present invention, the additional solar panels are supported by brackets attached directly to the vertical pillar (100), and they can be used to provide auxiliary charging to the battery (1).

Figure 15:
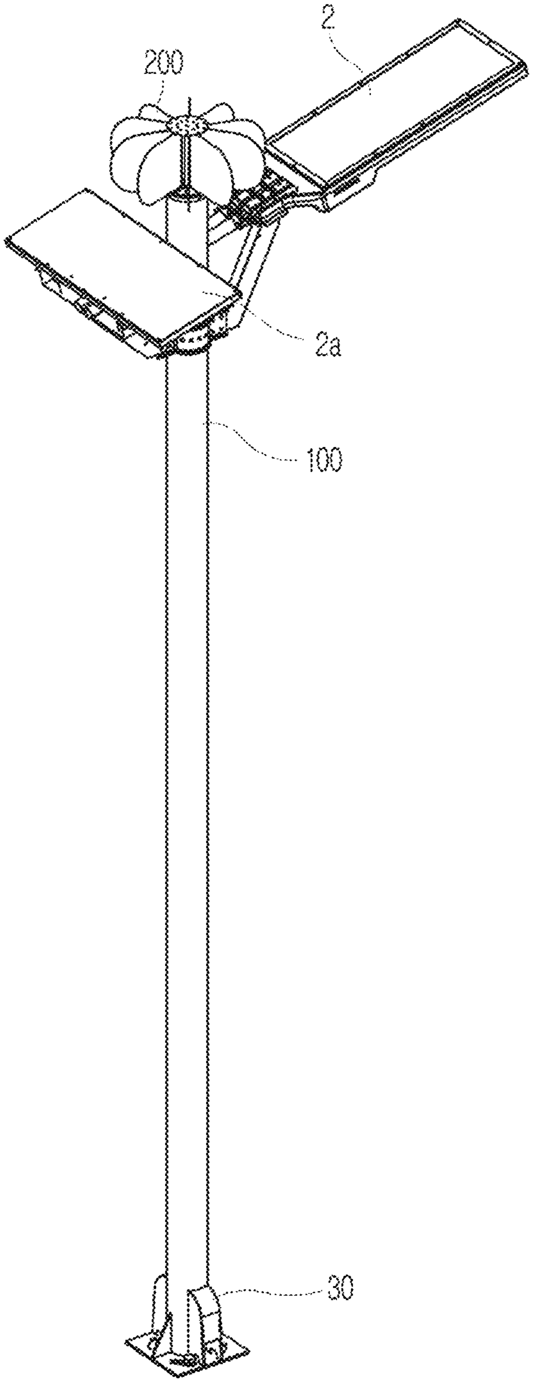
FIG. 15 to FIG. 17 are perspective views showing other examples of the present invention in which a wind power generation is added.
Figure 16:
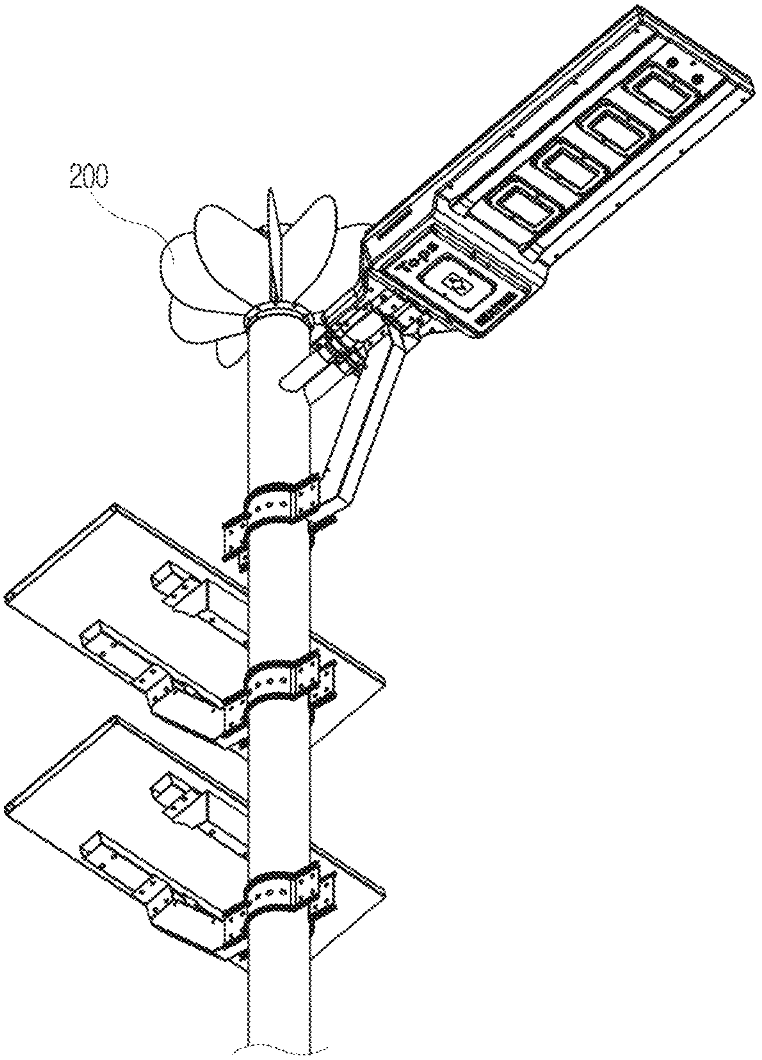
Figure 17:
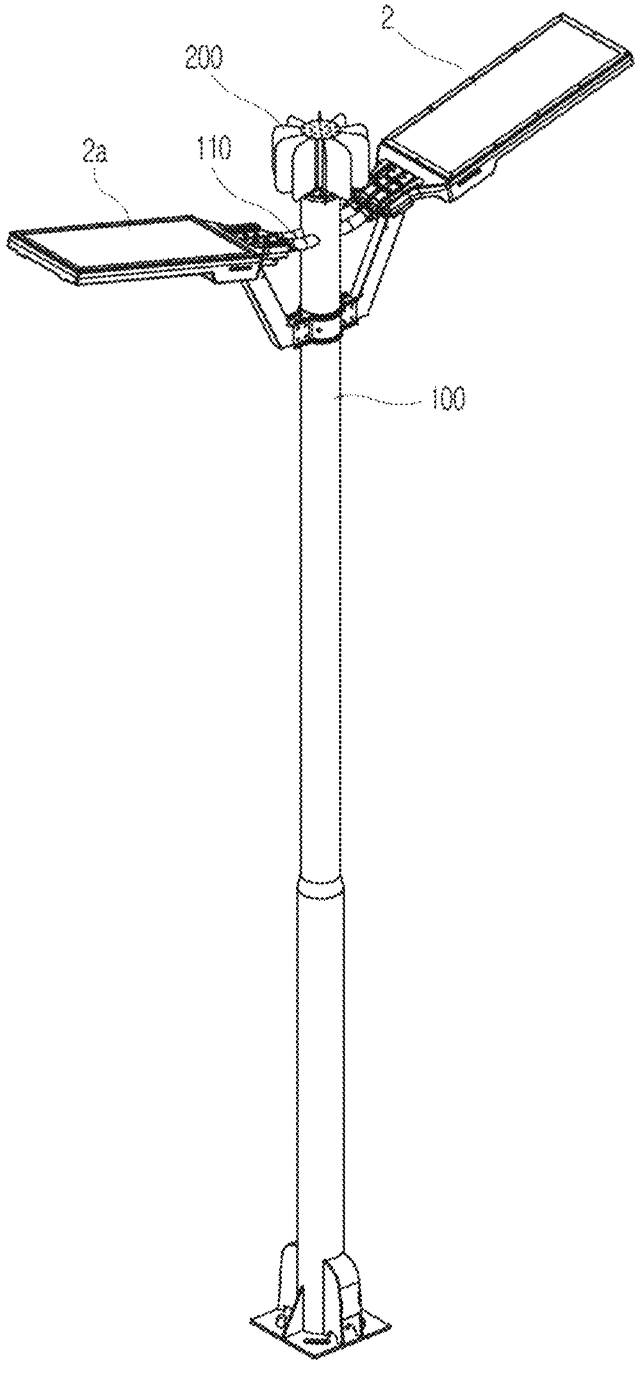

Referring to FIG. 15 to FIG. 17, which illustrate another embodiment of the present invention, the street lights includes a fan member (200) that rotates by natural wind is rotatably mounted on the upper end portion of the vertical pillar (100), a generator that generates electricity by the rotation of the fan member (200), a protective member (1*a*; see FIG. 12 and FIG. 13) that surrounds the battery and has a heating wire that receives electric energy from the generator and generates heat, a sensor member that senses the heating temperature of the battery, and a switch that selectively supplies electric energy generated from the generator to the battery or the heating wire according to the sensing temperature of the sensor member.

This wind-powered generation system helps to maintain battery warmth in winter and minimize overcooling, thereby preventing a decrease in the power generation capacity of the battery (1), while also providing auxiliary charging to the battery.

Figure 19A:
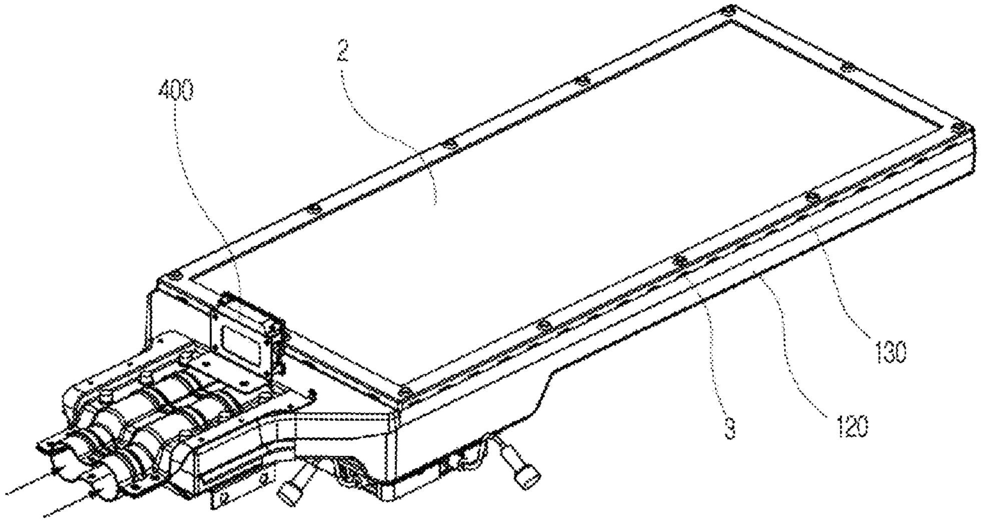
FIG. 19A and FIG. 19B are views showing further another embodiment of the present invention.
Figure 19B:
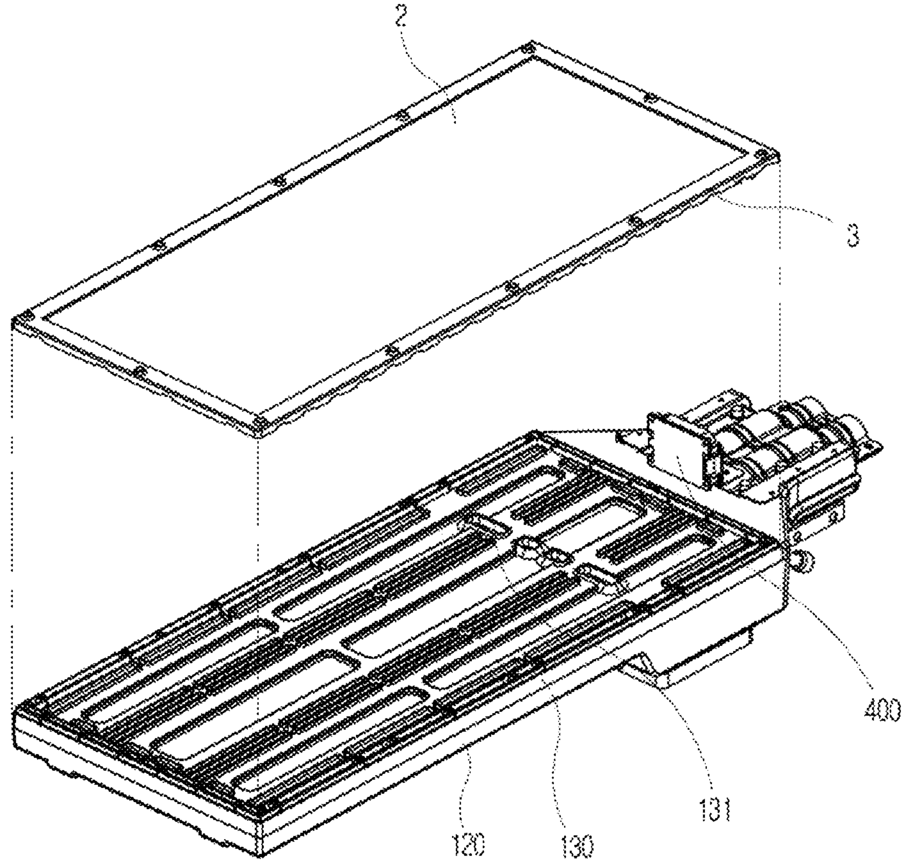

Meanwhile, referring to FIGS. 19A and 19B, which show another embodiment of the streetlight head portion, the street lights of the present invention may be provided with an alarm member (400) that generates an alarm sound, high frequency or low frequency, when a bird approaches the upper housing (130), thereby preventing the approach of birds and preventing contamination of the solar panel by excrement so as to improve power generation efficiency thereof.

Reference numeral 3 indicates an a through-hole formed in the frame of the mounting plate (2), through which the air discharged through the air outlet (131) is discharged to the outside or an external air is newly introduced to cool the solar panel.

Figure 20A:
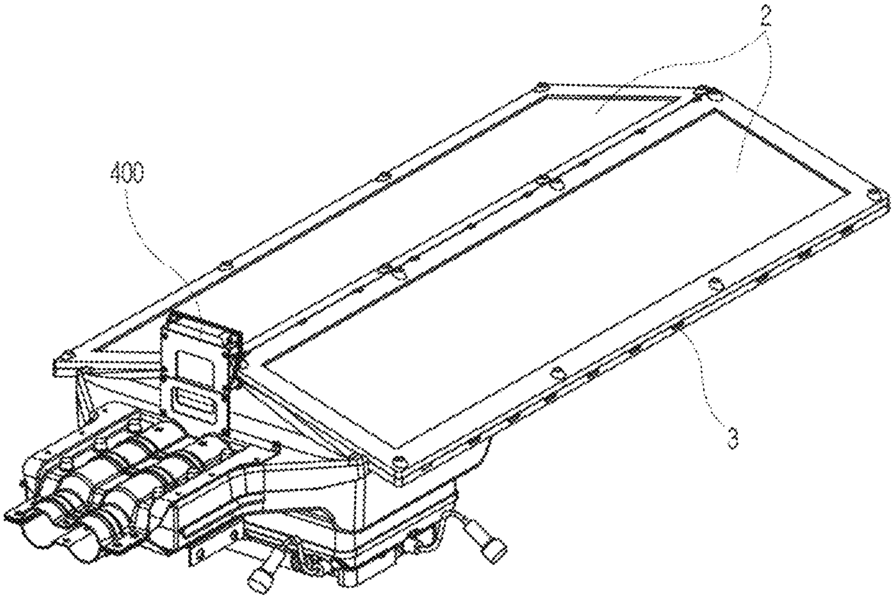
FIG. 20A to FIG. 20E are views showing further another embodiment of the present invention.
Figure 20B:
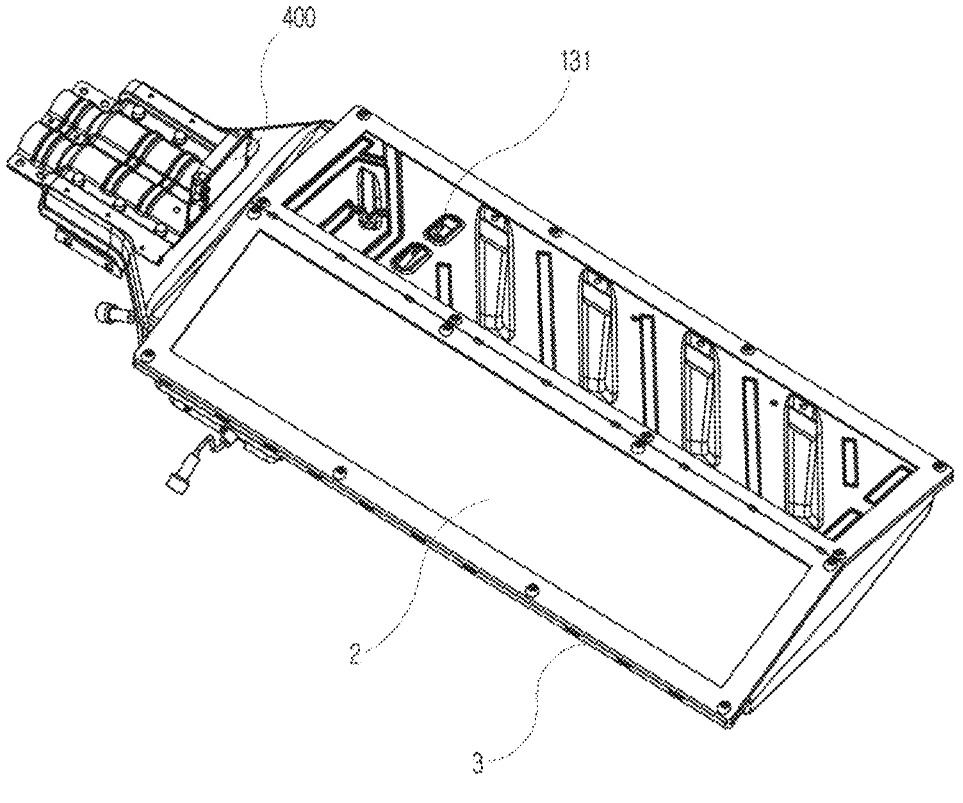
Figure 20C:
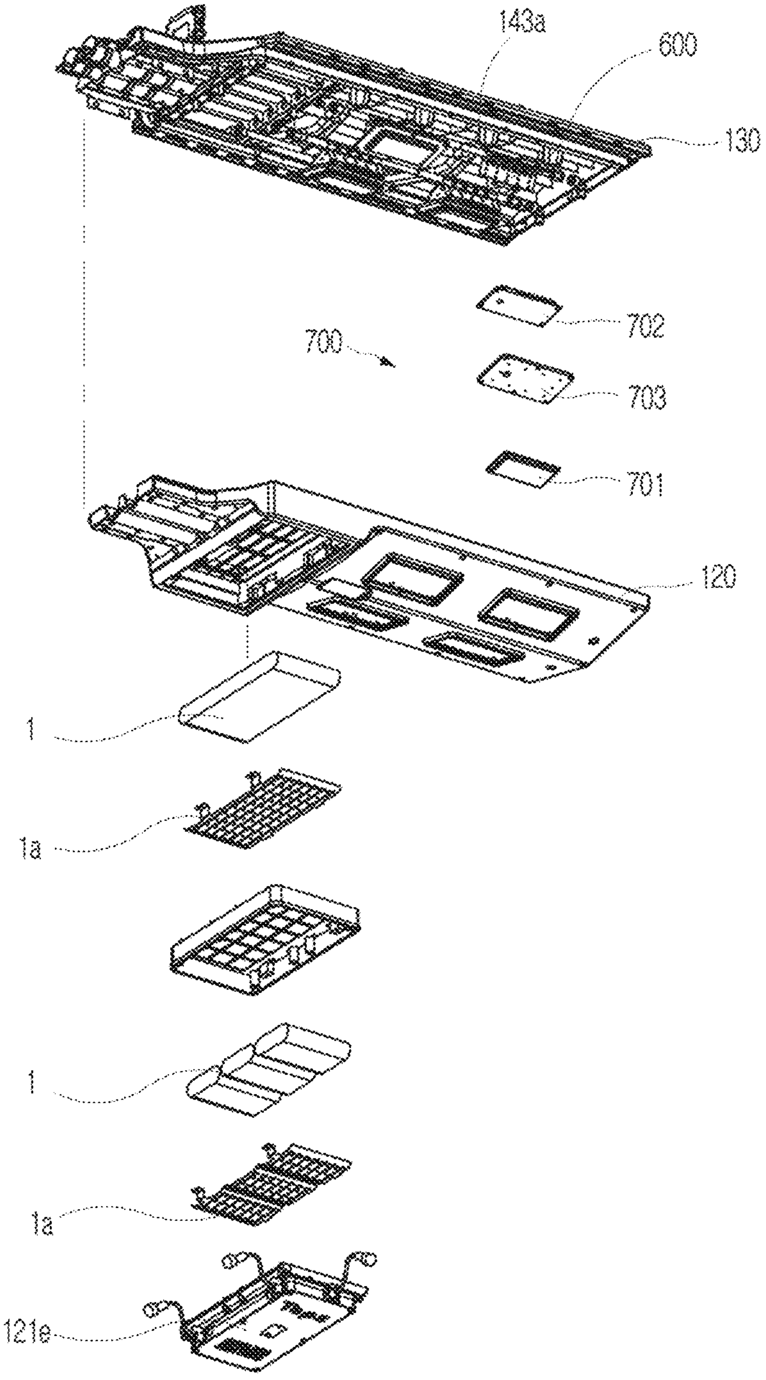
Figure 20D:
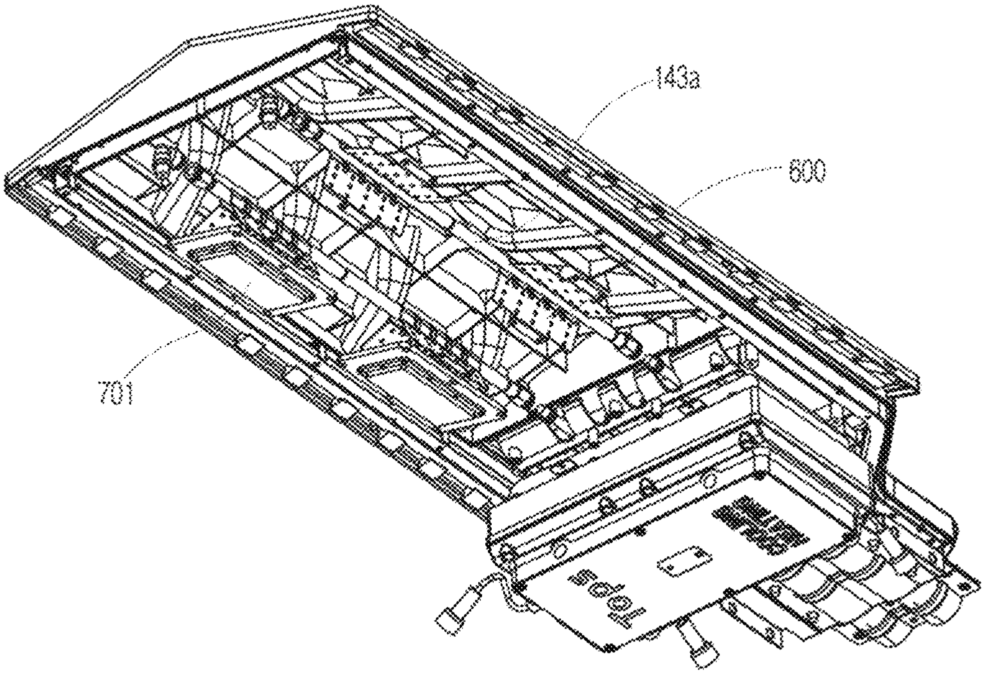

FIG. 20A to FIG. 20C illustrate another embodiment of the present invention. As shown, a pair of solar panels are arranged in a roof shape, enabling long-term charging in response to changes in the angle of incidence of sunlight due to the Earth's rotation and revolution.

In addition, a heat sink (600) is coupled to the air pipe (143*a*) and dissipates the heat generated from the LED module (700), so that the heat of the heat dissipation block (702) of the LED module (700) can be dissipated more effectively. Reference number 703 is a circuit board.

In addition, multiple batteries (1) are employed so that the charging can be sufficiently performed from multiple solar panels.

Figure 20E:
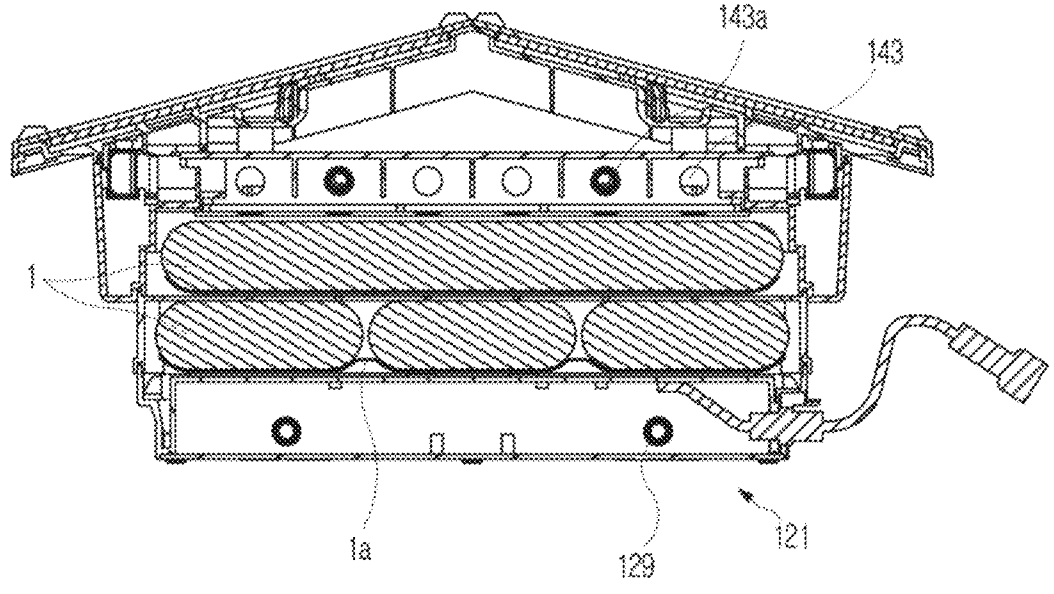

In addition, referring to FIG. 20E, at least one air passage pipe (129) penetrating the receiving portion (121) is arranged in the receiving portion (121) so as to dissipate heat from a circuit board (not shown) received in the receiving portion (121).

Figure 21A:
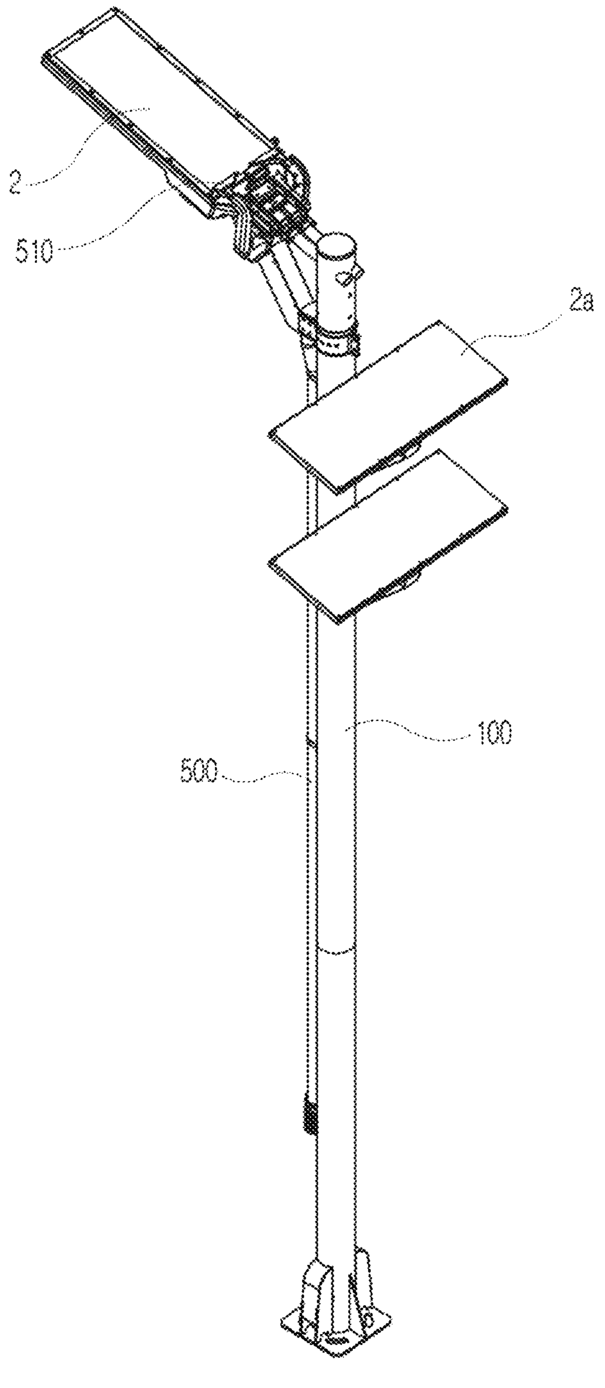
FIG. 21A and FIG. 21B are views showing further another embodiment of the present invention.
Figure 21B:
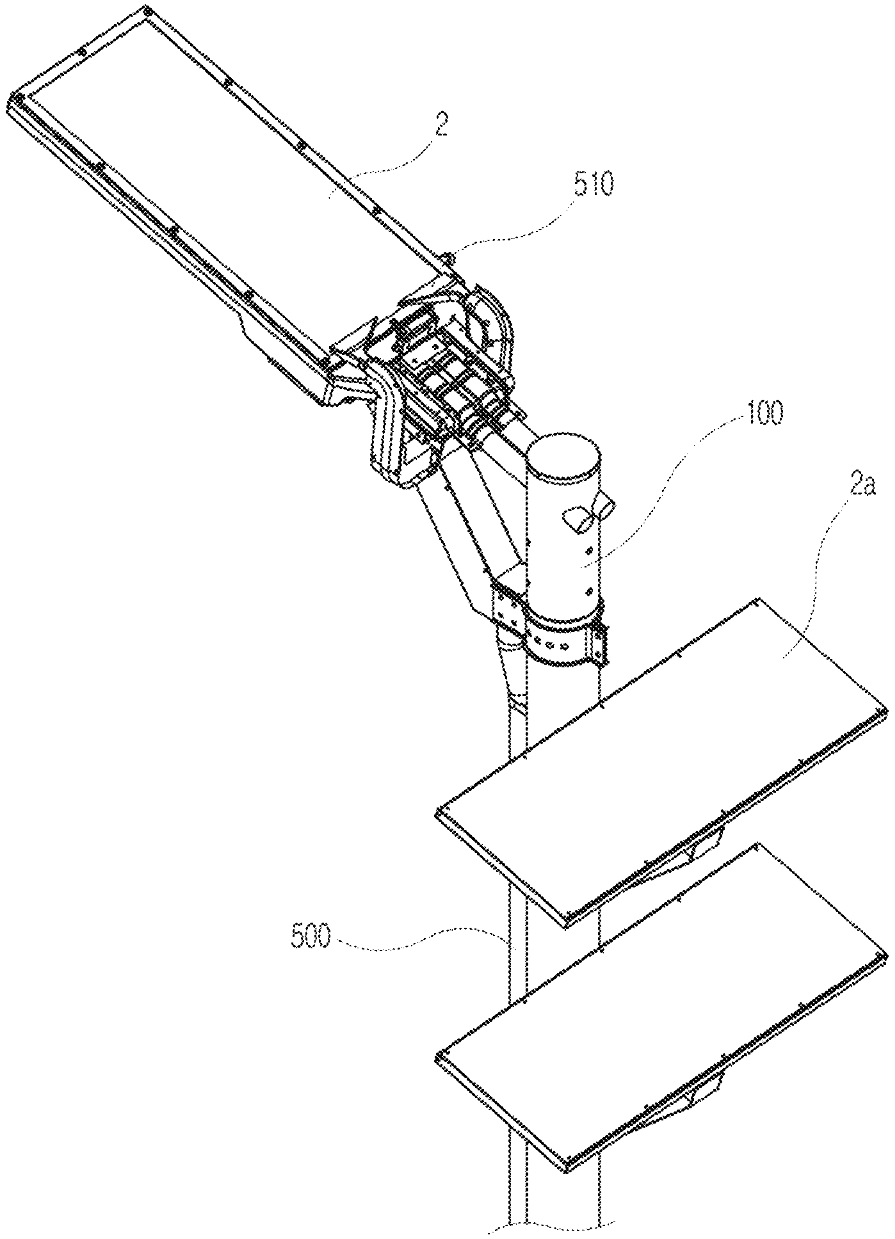

FIGS. 21A and 21B illustrates further another embodiment of the present invention embodiment, the street lights is also equipped with a hollow air conduit (500) placed in parallel to the vertical pillar (100), allowing the external air to be drawn in from below; and a nozzle (510) connected to the upper end portion of the air conduit (500), which blows the external air from the bottom of the air conduit (500) toward the solar panel.

This improves power generation efficiency by removing foreign substances such as sand that contaminate the solar panels through ventilation.

According to the present invention described above, the street lights head portion of the present invention improves the natural wind path using as the vertical pillar (100), the mounting rod (110), the air inlets/outlets (125), the air guide (140), the air outlet (131), and air guiding groove (132) to cool the PCB, the solar panel, the LED module, and the battery, thereby preventing the reduction in the power generation of the solar panel due to the high temperature of direct sunlight, the deterioration of the battery performance due to the high temperature, and the shortening of the lifespan of the LED.

Additionally, the present invention uses wind power generation to keep the battery warm during winter and reduce overcooling, thus preventing performance drops and allowing for auxiliary charging of the battery.

The present invention also generates alarm sounds to deter birds, preventing contamination of the solar panel by bird droppings. Moreover, it uses natural ventilation to effectively remove foreign substances such as sand and dust.

While the present invention has been described with respect to the specific embodiments, it will be apparent to those skilled in the art that various changes and modifications may be made without departing from the spirit and scope of the invention as defined in the following claims.

What is claimed is:

1. A solar cell street lights with a cooling device for streetlight head portion, where a battery (1) and a light emitting diode (LED) module are accommodated together and a solar panel is mounted, comprising:

a vertical pillar (100) fixed to a ground at a lower end of the vertical pillar (100) and having a first hollow portion (101) formed along it's body and an air inlet (102), through which an external air is introduced, communicated with the first hollow portion (101);

a hollow mounting rod (110) obliquely connected upward from one side of an upper end portion of the vertical pillar (100) and having a second hollow portion (112) communicated with the first hollow portion (101) and formed along the body of the hollow mounting rod (110);

a lower housing (120) having a receiving portion (121) for receiving the battery (1) formed on one side of the lower housing (120), a mounting hole (122) for mounting the LED module (700) formed on the other side of the lower housing (120); and one end connected to the hollow mounting rod (110) to be communicated with the second hollow portion (112); and an upper housing (130) mounted on an upper surface portion of the lower housing (120) to form an internal space (A) together with the lower housing (120) and having one end connected to the hollow mounting rod (110) to be communicated with the second hollow portion (112), an air outlet (131) for discharging air introduced through an air inlet (102), and a mounting plate (2), on which the solar panel is mounted and fixed, formed on an outer surface of the upper housing (130);

wherein the external air introduced through the air inlet (102) passes through the vertical pillar (100), the hollow mounting rod (110), and the receiving portion (121), and is discharged through the air outlet (131); and wherein the receiving portion (121) comprises an opening (121*a*) for insertion and removal of the battery (1) formed at a lower portion of the receiving portion (121); a side wall (121*b*) formed around a lateral circumference of the receiving portion (121); a plurality of seating ribs (121*c*) formed on a floor surface of the receiving portion (121) where the battery (1) is placed; a through-hole (121*d*) communicating with the internal space (A) formed between the plurality of seating ribs (121*c*); and a cover (121*e*) for opening and closing the opening (121*a*), so that it allows a heat released from the battery (1) to be discharged through the through holes (121*d*) and the air introduced from the hollow mounting rod (110) to flow near the through-hole (121*d*), thereby carrying the battery's heat with the air and eventually being discharged through the air outlet (131).

2. The solar cell street lights of claim 1, wherein an air guide (140) is detachably coupled to a floor surface of the receiving portion (121), so as to guide the air, which is introduced from the hollow mounting rod (110) toward the air outlet (131) and the air guide (140) includes a top plate (141) facing the floor surface of the receiving portion (121), a pair of side plates (142) formed to face each other at edges of the top plate (141), an air channel (145) formed between the pair of side plates (142), a plurality of air pipes (143) arranged across the air channel (145) and coupled at both ends to the pair of side plates (142) and through which the air introduced from the hollow mounting rod (110) passes, and an arc-shaped guide plate (144) extending from the pair of side plates (142) to guide the air, that has passed through the air pipes (143), toward the air outlet (131).

3. The solar cell street lights of claim 2, wherein among the plurality of air pipes (143), at least one air pipe (143*a*) is disposed to pass through the arc-shaped guide plate (144) and extends over the upper side of the LED module.

4. The solar cell street lights of claim 3, further comprises a heat sink (600) that is coupled to the at least one air pipe (143*a*) and dissipates the heat generated from the LED module (700).

5. The solar cell street lights of claim 2, wherein air inlets/outlets (125) are formed on both opposing side surface portion of the lower housing (120) and are communicated with the air channel (145) of the air guide (140).

6. The solar cell street lights of claim 2, wherein the vertical pillar (100) is equipped with a blocking member (30) that blocks both side portions and the upper portion of the air inlet (102); a bottom member (31) that blocks a lower portion of the air inlet (102) and has multiple through-holes formed therein; and a plug member (40) that opens and closes each of the through-holes.

7. The solar cell street lights of claim 2, further comprises:

a fan member (200) that rotates by natural wind is rotatably mounted on the upper end portion of the vertical pillar (100);

a generator that generates electricity by the rotation of the fan member (200);

a protective member (1*a*) that surrounds the battery and has a heating wire that receives electric energy from the generator and generates heat;

a sensor member that senses a heating temperature of the battery; and a switch that selectively supplies electric energy generated from the generator to the battery or the heating wire according to the sensing temperature of the sensor member.

8. The solar cell street lights of claim 1, wherein an air guiding groove (132) connected to the air outlet (131) is formed on an outer surface of the upper housing (130).

9. The solar cell street lights of claim 1, wherein an auxiliary mounting rod (115) is connected obliquely downward from the other side of the upper end portion of the vertical pillar (100) and has a third hollow portion (115*a*) formed in communication with the first hollow portion (101) and the second hollow portion (112); a pair of support brackets (116*a* and 116*b*) are coupled to the hollow mounting rod (110) and the auxiliary mounting rod (115); and a panel support frame (117) for supporting another solar panel is fixed to the pair of support brackets (116*a* and 116*b*).

10. The solar cell street lights of claim 9, wherein a spacing space (B) is formed between the panel support frame (117) and the solar panel.

11. The solar cell street lights of claim 1, further comprises an alarm member (400) for generating an alarm sound, high frequency or low frequency formed on the upper housing, when a bird approaches the upper housing (130), thereby preventing the approach of birds and preventing contamination of the solar panel by excrement.

12. The solar cell street lights of claim 1, further comprises:

a hollow air conduit (500) placed in parallel to the vertical pillar (100), allowing the external air to be drawn in from below; and a nozzle (510) connected to the upper end portion of the hollow air conduit (500), which blows the external air from the bottom of the hollow air conduit (500) toward the solar panel.

13. The solar cell street lights of claim 1, wherein at least one air passage pipe (129) penetrating the receiving portion (121) is arranged in the receiving portion (121) so as to dissipate heat from a circuit board received in the receiving portion (121).

* * * * *